(12) United States Patent
Kabamba et al.

(10) Patent No.: US 7,257,085 B2
(45) Date of Patent: Aug. 14, 2007

(54) METHOD AND CONTROLLER FOR DATA RATE ADAPTATION IN WIRELESS COMMUNICATION NETWORKS

(75) Inventors: Pierre T. Kabamba, Ann Arbor, MI (US); Semyon M. Meerkov, Ann Arbor, MI (US); Wayne E. Stark, Ann Arbor, MI (US); Choon Yik Tang, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 1063 days.

(21) Appl. No.: 10/175,222

(22) Filed: Jun. 19, 2002

(65) Prior Publication Data

US 2003/0053418 A1    Mar. 20, 2003

Related U.S. Application Data

(60) Provisional application No. 60/300,410, filed on Jun. 22, 2001.

(51) Int. Cl.
*G06F 11/00* (2006.01)
(52) U.S. Cl. .............. 370/241; 370/252; 370/278; 375/225; 375/295; 375/316
(58) Field of Classification Search .............. 370/252, 370/318, 241, 276, 277, 278; 375/224, 225, 375/295, 316
See application file for complete search history.

(56) References Cited

U.S. PATENT DOCUMENTS 5,684,791 A * 11/1997 Raychaudhuri et al. .. 370/310.2
5,808,760 A * 9/1998 Gfeller ..................... 398/27
5,937,016 A * 8/1999 Choi ....................... 375/341
6,400,773 B1 * 6/2002 Krongold et al. .......... 375/260
6,823,194 B2 * 11/2004 Haim ........................ 455/522
7,103,096 B2 * 9/2006 Mitlin et al. ............... 714/748
7,173,551 B2 * 2/2007 Vrazel et al. ............... 341/144

OTHER PUBLICATIONS

Nanda et al., "Adaptation Techniques in Wireless Packet Data Services", Jan. 2000, IEEE Communications Magazine, pp. 54-64.*
Kabamba et al, "Feedforward Control of Data Rate in Wireless Networks", University of Michigan, Report No. CGR-00-12, Nov. 2000.*
Pursley, Michael B., et al., Network Protocols For Frequency-Hop Packet Radios With Decoder Side Information, IEEE Journal On Selected Area In Communications, vol. 12, No. 4, May 1994, pp. 612-621.

(Continued)

*Primary Examiner*—Hassan Kizou
*Assistant Examiner*—Brian T O'Connor
(74) *Attorney, Agent, or Firm*—Brooks Kushman P.C.

(57) ABSTRACT

A wireless communication network with improved performance and a method and controller for controlling data rate in the network are provided. The invention provides a feedforward approach to data rate control in wireless networks. The invention is based on designing an optimal, but non-causal, controller and its subsequent "causification," which results in a practical, implementable controller, driven by an estimate of the bit error probability. This controller leads to a minimum 5%-85% increase in average throughput without additional power utilization, as compared with fixed data rate operation.

5 Claims, 2 Drawing Sheets

OTHER PUBLICATIONS

Gass, J.H., et al., Adaptive Transmission Protocols For Frequency-Hop Radio Networks, IEEE, 1998, South Carolina, pp. 282-286.

Pursley, Michael B., et al., Adaptive Transmission For Frequency-Hop Communications With Reed-Solomon Coding, IEEE, 1997, South Carolina, pp. 866-869.

Balachandran, Krishna, et al., Channel Quality Estimation And Rate Adaptation For Cellular Mobile Radio, IEEE Journal On Selected Areas In Communications, vol. 17, No. 7, Jul. 1999, pp. 1244-1256.

Kabamba, P.T., et al., Feedforward Control Of Data Rate In Wireless Networks, Proceedings Of The 40th IEEE Conference On Decision And Control, Orlando, Florida, Dec. 4-7, 2001.

* cited by examiner

METHOD AND CONTROLLER FOR DATA RATE ADAPTATION IN WIRELESS COMMUNICATION NETWORKS

CROSS-REFERENCE TO RELATED APPLICATION

This application claims the benefit of U.S. provisional application Ser. No. 60/300,410, filed Jun. 22, 2001.

BACKGROUND OF THE INVENTION

1. Field of the Invention

This invention relates to wireless communication networks and methods and controllers for controlling data rate therein.

2. Background Art

Feedback control of transmit power in wireless networks is a well established technology from both theoretical and practical perspectives. In contrast, control of data rate has been discussed in the following articles, where its efficacy has been demonstrated by simulations: M. B. Pursley and H. B. Russell, "Network Protocols for Frequency-Hop Packet Radios With Decoder Side Information," IEEE JOURNAL ON SELECTED AREAS IN COMMUNICATIONS, Vol. 12, No. 4, pp. 612-621, 1194; M. B. Pursley and C. S. Wilkins, "Adaptive Transmission for Frequency-Hop Communications with Reed-Solomon Coding," in PROC. PACIFIC RIM CONFERENCE ON COMMUNICATIONS, COMPUTERS AND SIGNAL PROCESSING, (Victoria, Canada), pp. 866-869, 1997; and J. H. Gass, M. B. Pursley, H. B. Russell, R. J. Saulitis, C. S. Wilkins, and J. S. Wysocarski, "Adaptive Transmission Protocols for Frequency-Hop Radio Networks," in PROC. IEEE MILITARY COMMUNICATIONS CONFERENCE, pp. 282-286, 1998.

A wireless communication network can be viewed as a serial connection of three functional, rather than physical, blocks that represent relations between the system's variables as shown in FIG. 1.

In FIG. 1, E(k) is the energy with which the kth packet is transmitted. Since packet duration is fixed, energy and power can be used interchangeably. Block 1 represents the functional relation between E(k) and the received signal-to-noise ratio (SNR), r(k). This includes the effect of shadowing, h(k), path loss, $\rho(k)$, and channel noise with multi-user interference, N(k). In particular, this relation takes the form $$r(k) = F_1(E(k), h(k), \rho(k), N(k)) = \frac{h(k)\rho(k)E(k)}{mnN(k)}, \quad (1.1)$$

where n is the number of coded symbols per packet and m is the number of bits representing each coded symbol.

Block 2 represents the relation between r(k) and the bit error probability, $p_{be}(k)$. The perturbation $\gamma(k)$ that acts on Block 2 is the channel uncertainty. $\gamma(k)$ represents the parameter that characterizes a Rician fading channel with binary frequency shift keying (BFSK) modulation and non-coherent demodulation:

$$p_{be}(k) = \quad (1.2)$$

$$F_2(r(k), \gamma(k)) = \frac{1+\gamma^2(k)}{2+\gamma^2(k)(2+r(k))} \exp\left(-\frac{r(k)}{2+\gamma^2(k)(2+r(k))}\right).$$

When $\gamma(k)=0$, the channel is an additive white Gaussian noise (AWGN) channel; when $\gamma(k)=\infty$, it is a Rayleigh fading channel.

In the decomposition of the physical wireless channel into Blocks 1 and 2, the first block models the total average received energy and the second the split of this energy between the direct path and multipath. A rigorous justification of this decomposition can be obtained following the arguments given in the prior art.

Block 3 represents the relation between $p_{be}(k)$ and the probability that the kth packet is successfully transmitted, $p_{st}(k)$, assuming that q(k) data symbols were included in the packet of length n, i.e., n−q(k) symbols were devoted to coding. In this application, it is assumed that a Reed-Solomon (RS) code is used, in which case this relation is given by:

$$p_{st}(k) = F_3(q(k), p_{be}(k)) = \quad (1.3)$$

$$\sum_{j=0}^{\lfloor \frac{n-q(k)}{2} \rfloor} \binom{n}{j}(1-(1-p_{be}(k))^m)^j(1-p_{be}(k))^{m-(n-j)}.$$

As the performance measure of this network, its average throughput is defined as:

$$T_{av} = \lim_{K\to\infty} \frac{1}{K}\sum_{k=1}^{K} E[T(k)], \quad (1.4)$$

where T(k) is the instantaneous throughput defined as $$T(k)=q(k)p_{st}(k), \quad (1.5)$$

and E[·] denotes the expectation.

When the system operates with a fixed transmit power $E(k) \equiv E_d$ and fixed data rate $q(k) \equiv q_d$, it is referred to as an open-loop network.

As mentioned above, modern wireless networks use feedback power control to combat disturbances and improve $T_{av}$. A functional block diagram of a system with feedback power control is shown in FIG. 2. In this Figure, $r_d$ represents the desired level of SNR, and the deviation of r(k) from $r_d$ is the argument of the control law $F_4$. In practice, this law may be selected as:

$$E_{dB}(k+1)=E_{dB}(k)+\Delta \text{sign}(r_d-r(k)),$$

where $E_{dB}(k)=10\log_{10}E(k)$, $\Delta>0$ is a step in power increase/decrease, and $$\text{sign}(x) = \begin{cases} 1, & \text{if } x > 0, \\ 0, & \text{if } x = 0, \\ -1, & \text{if } x < 0. \end{cases}$$

If this controller operates efficiently, r(k) at the output of Block 1 is close to $r_d$ and $T_{av}$, defined by (1.4), is improved compared to open-loop performance. However, even if the disturbances h(k), $\rho(k)$, and N(k) are compensated for completely, i.e., $r(k) \equiv r_d$, the channel uncertainty, $\gamma(k)$, being outside of the control loop, would not be rejected, which would adversely affect $T_{av}$. Therefore, further control measures, intended to accommodate $\gamma(k)$ and, in addition, help feedback power control in combating $h(k)$, $\rho(k)$, and $N(k)$ are desirable.

Another input variable that may be controlled is the data rate, $q(k)$. However, feedback control of $q(k)$ does not seem to be feasible. Indeed, whereas in power control one can defined the desired SNR (i.e., $r_d$), in rate control no desired set point for $q(k)$ can be defined since it would depend on the unknown factors, for instance, $h(k)$ and $\gamma(k)$. Therefore, feedback control of $q(k)$ is not feasible.

It should be pointed out that in asynchronous transfer mode (ATM) networks, feedback control of data rate is not only possible but is quite efficient. The reason is that in the ATM environment the occupancy of buffers at the switching nodes is affected by the admission data rate and therefore, regulating buffer occupancy to the desired level, effectively regulates data rate in a feedback manner.

Another possibility to consider would be feedforward control. To accomplish this, one would need to use the probability of bit error, $p_{be}(k)$, and calculate $q(k)$ so that the instantaneous throughput $T(k)$, defined by (1.5), is maximized. A block diagram of the network with both feedback power control and feedforward rate control is shown in FIG. 3.

There are, however, impediments to this approach. First, $p_{be}(k)$ is not known in real-time, and what might be available is the number of bit errors, $n_{be}(k)$, when the packet is successfully decoded by a block code. Second, even if $p_{be}(k)$ were known, it would be available only after the transmission took place, i.e., $p_{be}(k)$ would have to be used to calculate not $q(k)$ but $q(k+1)$. Consequently, there is a need for a practical feedforward controller that overcomes these impediments.

SUMMARY OF THE INVENTION

An object of the present invention is to provide a method and controller for data rate adaptation in wireless communication networks in order to improve their performance (i.e., their throughput and power efficiency).

In carrying out the above object and other objects of the present invention, a wireless communication network is provided. The network includes a transmitter for wirelessly transmitting symbols represented by bits, and a receiver for receiving the symbols. The network further includes a controller for generating a data rate control signal which controls data rate based on an estimate of bit error probability to improve performance of the network.

The estimate of bit error probability may be based on number of bit errors that have occurred during a transmission in the network.

The network may further include a feedback power controller for controlling transmit power in the network.

Further in carrying out the above object and other objects of the present invention, a method for controlling data rate of a wireless communications network is provided wherein the receiver receives symbols represented by bits. The method includes generating an estimate of bit error probability and generating a control signal which controls data rate based on the estimate of bit error probability to improve performance of the network.

Still further in carrying out the above object and other objects of the present invention, a controller for controlling data rate of a wireless communication network is provided wherein the receiver receives symbols represented by bits. The controller includes means for generating an estimate of bit error probability, and means for generating a control signal which controls data rate based on the estimate of bit error probability to improve performance of the network.

The controller may further include a memory for storing the number of bit errors that have occurred during the transmission.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENTS

Figure 1:
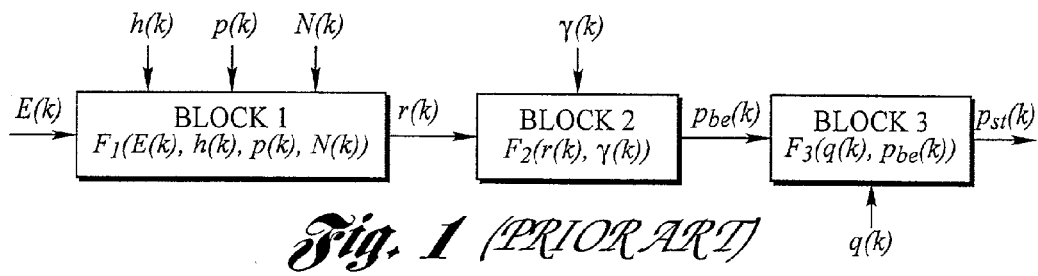
FIG. 1 is a functional block diagram of a prior art open-loop network.
Figure 2:
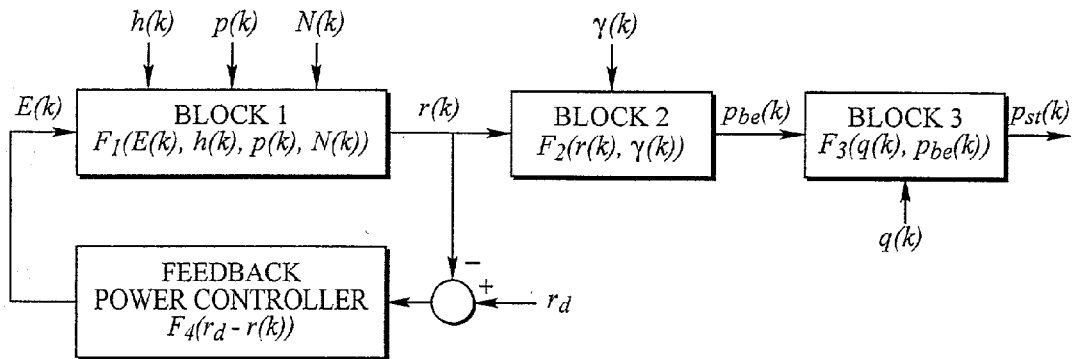
FIG. 2 is a diagram similar to the diagram of FIG. 1, but including feedback power control.
Figure 3:
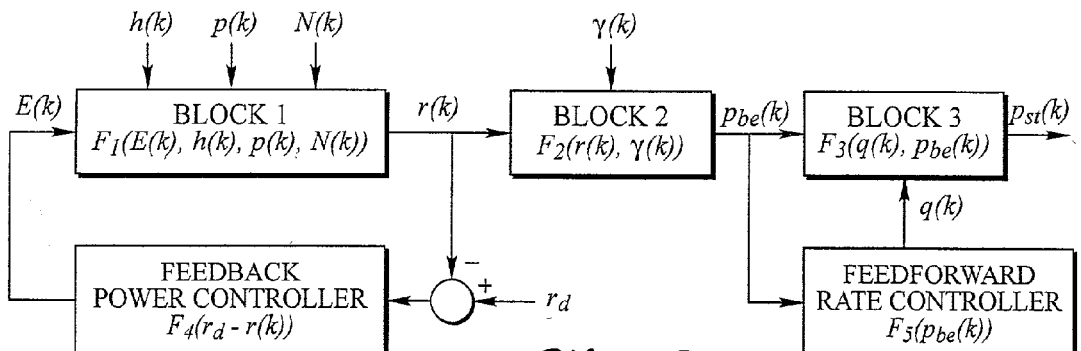
FIG. 3 is a diagram similar to the diagram of FIG. 2, but including feed forward rate control.

The problems addressed and solved by the present invention are as follows:

1. The least upper bound of the achievable efficacy of feedforward data rate control in improving $T_{av}$. This is accomplished by designing an optimal but non-causal and non-realistic controller, whereby $q(k)$ is calculated as a function of $p_{be}(k)$. This controller leads to a minimum of 35%-95% increase in average throughput without additional power utilization, as compared with fixed data rate operation.
2. Based on the above optimal controller, a sequence of suboptimal controllers that make it causal and realistic is provided. The final suboptimal controller calculates $q(k)$ as a function of $n_{be}(k-1)$, $n_{be}(k-2)$, . . . ,$n_{be}(k-L)$, where L is a positive integer representing the memory of the controller.
3. The performance degradation of suboptimal controllers due to both causification and making them realistic is described. In the scenario considered herein, the final suboptimal controller results in 5%-25% degradation compared to the optimal controller, and a minimum of 5%-85% improvement compared to fixed data rate operation. Thus, an implementable, i.e., causal and realistic, controller is obtained that improves $T_{av}$ substantially without additional power expenditure.

Modeling

The wireless network described herein includes a transmitter (mobile user), a channel, and a receiver (base station).

Transmitter

The transmitter sends information to the receiver in packets of fixed duration. The kth packet, k=1,2, . . . , consists of $q(k)$ data symbols and is sent with transmit power $E(k)$, where $q(k) \in \{1,2, \ldots ,n\}$ and each symbol belongs to the Galois field with $2^m$ elements, m>1. For the kth packet, the (n, q(k)) RS code is used to map the q(k) data symbols into n coded symbols if q(k)<n. If q(k)=n, no coding is performed. Each coded symbol is in turn mapped into m bits, yielding a total of mn bits. BFSK modulation is then used to transmit the mn bits with power $$\frac{E(k)}{mn}$$

per bit across the channel.

Channel

The channel attenuates the transmitted signal by shadowing, h(k), and path loss, ρ(k), and distorts it with AWGN and multi-user interference, N(k). It is assumed that these disturbances are such that the SNR is constant for each bit in the kth packet. Therefore, the SNR during the transmission of the kth packet can be represented as given in (1.1).

In addition to the above-mentioned disturbances, the channel also exhibits Rician fading with parameter γ(k), which represents the ratio of the strength of the multipath to the strength of the direct path. This parameter is also assumed to be constant during the transmission of the kth packet.

The assumption that h(k), ρ(k), N(k), r(k), and γ(k) are constant during the transmission of the kth packet is introduced to simplify the analysis. Although it is somewhat artificial, it is not unrealistic because the packet duration is usually short relative to the rate of change of these perturbations; therefore all bits in a packet are transmitted roughly under the same conditions.

Receiver

For the kth packet, the receiver performs noncoherent demodulation on the received signal to obtain mn bits, where bit errors are assumed to occur independently. The mn bits are in turn mapped into n coded symbols. The (n,q(k)) RS decoder is then used to map the n received symbols into q(k) data symbols if q(k)<n, which may not be successful. If q(k)=n, no decoding is performed. the kth packet is said to be successfully transmitted/received if the q(k) data symbols are correctly decoded.

The conditional probability that the number of bit errors in the kth packet, $n_{be}(k)$, equal to l is:

$$\text{Prob}(n_{be}(k) = l | p_{be}(k)) = \binom{mn}{l} p_{be}^l(k)(1 - p_{be}(k))^{mn-l}.$$

The condition $p_{be}(k)$ is a random event since γ(k) is assumed to be random. Since a coded symbol is correctly received if and only if all the m bits representing it are correctly received, the probability of coded symbol error for each symbol in the kth packet, $p_{ce}(k)$, is related to $p_{be}(k)$ by:

$$p_{ce}(k) = 1 - (1 - p_{be}(k))^m. \tag{2.1}$$

Furthermore, since the (n,q(k)) RS code can correct up to $$\left\lfloor \frac{n - q(k)}{2} \right\rfloor$$

errors, the probability that the kth packet is successfully transmitted, $p_{st}(k)$, is given by:

$$p_{st}(k) = \sum_{j=0}^{\left\lfloor \frac{n-q(k)}{2} \right\rfloor} \binom{n}{j} p_{ce}^j(k)(1 - p_{ce}(k))^{n-j},$$

which coincides with (1.3) when (2.1) is substituted for $p_{ce}(k)$.

Information Available for Control

As it follows from the above, if the kth packet is received successfully, the receiver has the knowledge of the number of bit errors, $n_{be}(k)$, that have occurred during the transmission. If the kth packet is not received successfully, $n_{be}(k)$ is not available. To overcome this problem, it is assumed that in this case, the number of coded symbol errors, $n_{ce}(k)$, is equal to the maximum error correcting capability plus one, i.e., $$N_{CE}(k) = \left\lfloor \frac{n - q(k)}{2} \right\rfloor + 1.$$

The corresponding $n_{be}(k)$ can be then estimated using this assumption and expression (2.1), by substituting frequencies instead of the probabilities, i.e., $$\frac{\left\lfloor \frac{n - q(k)}{2} + 1 \right\rfloor}{n} \approx 1 - \left(1 - \frac{n_{be}(k)}{mn}\right)^m \text{ or}$$

$$n_{be}(k) \approx mn\left(1 - \left(1 - \frac{\left\lfloor \frac{n - q(k)}{2} + 1 \right\rfloor}{n}\right)^{\frac{1}{m}}\right).$$

Thus, the information available for control is:

$$n'_{be}(k) = \begin{cases} n_{be}(k), & \text{if the } k\text{th packet is received successfully,} \\ mn\left(1 - \left(1 - \frac{\left\lfloor \frac{n - q(k)}{2} + 1 \right\rfloor}{n}\right)^{\frac{1}{m}}\right), & \text{otherwise.} \end{cases} \tag{2.2}$$

Although in reality only $n'_{be}(k)$ is available, to simplify the analysis, it is assumed below that $n_{be}(k)$ is known, whether or not the kth packet has been received successfully. However, at the final stage of the development (see below) the system is similar and operating with $n'_{be}(k)$, rather than $n_{be}(k)$, and it is shown that its performance remains practically unchanged.

Data Rate Controllers

A sequence of data rate controllers is now described, which differ from the point of view of the information used for control, i.e., for calculating q(k). An optimal but non-implementable controller is initially described and gradually improves its implementability until a practical, implementable controller is obtained.

Optimal (O) Controller

It is assumed that $p_{be}(k)$ is available for calculating q(k). this information structure is non-causal since $p_{be}(k)$ is assumed to be available before the kth packet is transmitted It is non-realistic because only frequency $$\frac{n_{be}(k)}{mn},$$

rather than probability $p_{be}(k)$, may be available for control. As it was pointed out above, this control is designed to investigate the least upper bound on the efficacy of data rate control.

To derive the controller that maximizes $$T_{av} = \lim_{K \to \infty} \frac{1}{K} \sum_{k=1}^{K} E[q(k) p_{st}(k)] \quad (3.1)$$

$$= \lim_{K \to \infty} \frac{1}{K} \sum_{k=1}^{K} E[q(k) F_3(a(k), p_{be}(k))],$$

It is observed that the process at hand is memoryless and, therefore, maximization of $T_{av}$ is equivalent to the maximization of the expected value of the instantaneous throughput (1.5), i.e., of each term in the sum given by (3.1). Thus, the optimal controller is given by:

$$q(k) = F_5(p_{be}(k)) = \underset{q_0 \in \{1,2,\ldots,n\}}{\operatorname{argmax}} q_0 F_3(q_0, p_{be}(k)), k = 1, 2, \ldots \quad (3.2)$$

Figure 4:
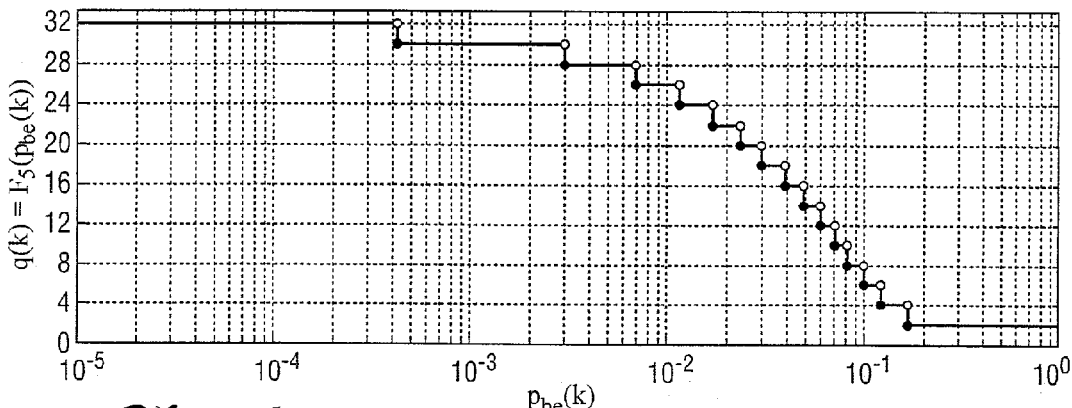
FIG. 4 is a graph which illustrates an optimal control $q(k)=F_5(p_{be}(k))$ for n=32 and m=5.
Figure 5:
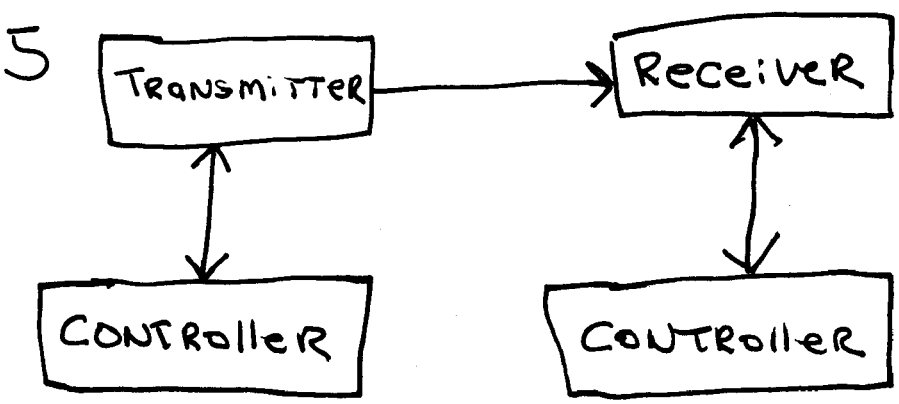
FIG. 5 is a schematic block diagram of a wireless network including a transmitter, a receiver, a feed forward data rate controller and a feedback power controller constructed in accordance with one embodiment of the present invention.

For the case of n=32 and m=5, this controller is illustrated in FIG. 4. Obviously, it is a static, nonlinear controller. It is also obvious that this is a feedforward controller, since $p_{be}(k)$ provides the information about the disturbances ($\gamma(k)$ and others), acting on the system, and the controller determines the control signal q(k), which counteracts the effect of these disturbances in order to maximize $T_{av}$.

Performance of all other controllers introduced herein are compared to that of (3.2).

Causal, Non-Realistic (CNR) Controller

Here, it is assumed that $p_{be}(k-1)$ is available for calculating q(k) and the controller is defined as:

$$q(k) = F_5(p_{be}(k-1)), k=2,3,\ldots, \quad (3.3)$$

with initial condition q(1) $\in$ {1,2, . . . ,n}, where $F_5(\cdot)$ is defined by (3.2). Obviously, this controller is causal since q(k) depends on $p_{be}(k-1)$.

Non-Causal, Realistic (NCR) Controller

Here, it is assumed that $n_{be}(k)$ is available for control and the controller is defined as:

$$q(k) = F_5\left(\frac{n_{be}(k)}{mn}\right), k = 1, 2, \ldots, \quad (3.4)$$

where $F_5(\cdot)$ is given by (3.2).

Causal, Realistic (CR) Controller

It is assumed, finally, that only $n_{be}(k-1)$ is available for calculating q(k). This suggests the controller $$q(k) = F_5\left(\frac{n_{be}(k-1)}{mn}\right), k = 2, 3, \ldots, \quad (3.5)$$

with initial condition q(1) $\in$ {1,2, . . . ,n}.

It turns out that, unlike all previous ones, this controller might lead to a substantial loss of performance in comparison with the optimal one. Therefore, a filtered version of this controller is introduced below.

Causal, Realistic Controller with Filtering (CRF)

Typically, bit error probability $p_{be}(k)$ lies in the range of $10^{-1}$ to $10^{-7}$. Thus, in order for $$\frac{n_{be}(k)}{mn}$$

to be an accurate estimate of $p_{be}(k)$, the number of bits in a packet mn should be sufficiently large. In most practical situations, mn cannot be chosen to be very large. To improve the quality of the estimate, which would in turn reduce the performance loss, a filter with finite memory L is inserted into (3.5) in the following manner:

$$n_{be}(k-1) = (1-\alpha) \sum_{j=1}^{\min\{k-1,L\}} \alpha^{j-1} n_{be}(k-j), k = 2, 3, \ldots, \quad (3.6a)$$

$$q(k) = F_5\left(\frac{n_{be}(k-1)}{mn}\right), k = 2, 3, \ldots, \quad (3.6b)$$

with initial condition q(1) $\in$ {1, . . . , n}, where $\alpha$ Å[0,1) and L, a positive integer, are design parameters. (3.6) reduces to (3.5) when $\alpha$=0.

Implementable (I) Controller

Although controllers (3.5) and (3.6) are causal and realistic, they are still not implementable since they are based on $n_{be}(k)$, which in reality is available only when the kth packet is received successfully. To obtain an implementable controller, $n_{be}(k)$ is replaced in (3.6a) with $n'_{be}(k)$ defined in (2.2). Thus, an implementable controller with filtering can be represented as follows:

$$n'_{be}(k-1) = (1-\alpha) \sum_{j=1}^{\min\{k-1,L\}} \alpha^{j-1} n'_{be}(k-j), k = 2, 3, \ldots, \quad (3.7a)$$

-continued $$q(k) = F_5\left(\frac{n'_{be}k - 1)}{mn}\right), k = 2, 3, \ldots, \quad (3.7b)$$

with initial condition $q(1) \in \{1,2,\ldots,n\}$, where again, $\alpha \in [0,1)$ and L, a positive integer, are design parameters.

A feedforward data rate controller for wireless networks is described above which may be used synergistically with existing feedback power control schemes. Alternatively, it may lead to a possibility of novel architectures, where power control is used only to solve the near-far problem, and the rejection of all channel disturbances is accomplished by data rate control. This would reduce the possibility of power wars, which may be advantageous in a number of applications, in particular, in ad hoc networks. The drawback of this architecture would be the variable data rate of transmission which, in principle, may be counteracted by a variable compression rate.

While the best mode for carrying out the invention has been described in detail, those familiar with the art to which this invention relates will recognize various alternative designs and embodiments for practicing the invention as defined by the following claims.

What is claimed is:

1. A wireless communication network comprising:
   a transmitter for wirelessly transmitting symbols represented by bits;
   a receiver for receiving the symbols; and
   a feed forward data rate controller for generating a data rate control signal which controls data rate of a current transmission based on an estimate of bit error probability for the current transmission to improve performance of the network wherein the estimate of bit error probability is based on number of bit errors that have previously occurred during at least one transmission which occurred prior to the current transmission in the network and wherein the estimate is not based on the number of bit errors during the current transmission.

2. The network as claimed in claim 1 further comprising a feedback power controller for controlling transmit power in the network.

3. A method for controlling data rate of a wireless communications network wherein the receiver receives symbols represented by bits, the method comprising:
   generating an estimate of bit error probability for a current transmission; and
   generating a control signal which controls data rate of the current transmission based on the estimate of bit error probability to improve performance of the network wherein the estimate of bit error probability is based on number of error bits that have previously occurred during at least one transmission which occurred prior to the current transmission in the network and wherein the estimate is not based on the number of bit errors during the current transmission.

4. A controller for controlling data rate of a wireless communication network wherein the receiver receives symbols represented by bits, the controller comprising:
   means for generating an estimate of bit error probability for a current transmission; and
   feed forward data rate control means for generating a control signal which controls data rate of a current transmission based on the estimate of bit error probability to improve performance of the network wherein the estimate of bit probability is based on number of bit errors that have previously occurred during at least one transmission which occurred prior to the current transmission in the network and wherein the estimate is not based on the number of bit errors during the current transmission.

5. The controller as claimed in claim 4 further comprising a memory for storing the number of bit errors that have previously occurred during the at least one transmission.

* * * * *